United States Patent [19]
Takahashi et al.

[11] Patent Number: 6,147,041
[45] Date of Patent: Nov. 14, 2000

[54] REMOVABLE INK COMPOSITION AND PROCESS FOR REMOVING SAID INK COMPOSITION FROM PRINTED ARTICLES

[75] Inventors: Masayuki Takahashi, Kasukabe; Yasuyuki Ogisu, Yoshikawa; Katsufumi Iiboshi, Okegawa; Masahiro Kondo, Kitaadachi-gun; Takao Mizumoto, Kawaguchi; Kathufumi Awaya, Koshigaya, all of Japan

[73] Assignee: Dainichiseika Color & Chemicals Mfg. Co., Ltd., Tokyo, Japan

[21] Appl. No.: 09/231,207

[22] Filed: Jan. 14, 1999

[30] Foreign Application Priority Data

Jan. 21, 1998  [JP]  Japan ................... 10-009968

[51] Int. Cl.⁷ .............................. C09D 11/02; C09D 11/08
[52] U.S. Cl. .......................... 510/174; 523/160; 523/161; 106/31.6
[58] Field of Search ............................ 510/174; 523/160, 523/161; 106/31.6

[56] References Cited

U.S. PATENT DOCUMENTS 5,098,478  3/1992  Krishnan et al. ......................... 106/23
5,473,006  12/1995  Hutter et al. ............................. 524/459
5,534,049  7/1996  Wallstrom et al. ..................... 106/22 R

FOREIGN PATENT DOCUMENTS 0 373 882  6/1990  European Pat. Off. .
373882     6/1990  European Pat. Off. .
0 604 890  7/1994  European Pat. Off. .

OTHER PUBLICATIONS

Database WPI, Section CH, Week 8937, Derwent Publications Ltd., London, GB, Class A97, AN 89–266927 of JP 01 193378 (Aug. 3, 1989).

Primary Examiner—Yogendra Gupta
Assistant Examiner—Charles Boyer
Attorney, Agent, or Firm—Frishauf, Holtz, Goodman, Langer & Chick, P.C.

[57] ABSTRACT

A removable ink composition comprising (A) at least one of a urethane resin and an acrylic resin and (B) a vehicle including as a main component one or more substances selected from the group consisting of a styrene-acrylic acid copolymer, a styrene-maleic acid resin, a rosin-maleic acid resin and a phenol resin. A process for removing an ink composition from printed articles which comprises treating articles printed with this ink composition with an aqueous alkali solution. Prints of the ink composition on plastic films and plastic containers can be removed and decolorized in a short time by treating the ink composition with a dilute aqueous alkali solution having a concentration of 1 to 3%.

20 Claims, No Drawings

REMOVABLE INK COMPOSITION AND PROCESS FOR REMOVING SAID INK COMPOSITION FROM PRINTED ARTICLES

BACKGROUND OF THE INVENTION

1. Field of the Invention

The present invention relates to a removable ink composition used for prints on plastic containers and plastic films, and more particularly, to an ink composition which is used for prints on plastic films and plastic containers and can be removed and decolorized easily by treating the ink composition with a dilute aqueous alkali solution and a process for removing the ink composition from articles printed with the ink composition.

2. Description of the Related Arts

Various containers made of polyethylene terephthalate have been used widely as containers of refreshing drinks, cosmetics, seasonings and drugs. Trade names and descriptions about contents are directly printed on the surface of these containers or printed on labels which are attached to the surface of these containers.

Environmental pollution caused by disposed containers, labels and packaging bags made of plastics which are hardly decomposed in the natural condition has recently become a problem and it is urgently required to decrease the amount of such disposed articles. Recovery of plastic materials from containers of refreshing drinks which are generally called PET bottles has been advanced considerably. The recovered plastic materials are fabricated again to prepare secondary products.

Plastic articles such as containers from which the materials are recovered are attached with printed shrink films. Secondary products fabricated using the recovered plastic materials are not free from various colors unless inks used in the prints are removed or decolorized before the fabrication. Therefore, it is necessary that inks used in the prints be removed or decolorized to obtain secondary products having properties similar to products which are made of new materials.

As the process for decolorizing printed plastic articles, for example, a process in which plastic articles are treated with a cleaning liquid containing an organic solvent which dissolves or swells the coating material of the prints and a caustic alkali as essential components, is known (Japanese Patent Publication Showa 52(1977)-26549).

This process has a drawback in that the organic solvent contained in the waste liquid must be separated and recovered and the operations of separation and recovery must be additionally conducted. Moreover, gravure ink compositions generally used for plastic films and plastic containers are prepared by adding pigments to a vehicle containing a urethane resin or an acrylic resin as the main component, cellulose resins, vinyl acetate resins and rosin. Therefore, it is difficult to remove or decolorize the ink compositions used in the prints by treating the ink compositions with an aqueous solution of sodium hydroxide having a concentration of 1 to 3%. It is urgently required that the above problems be solved and colorless materials be recovered from plastic films and plastic containers by treating ink compositions used in the prints on plastic films and plastic containers with a dilute alkali solution.

SUMMARY OF THE INVENTION

An object of the present invention is to provide an ink composition which is used for prints on plastic films and plastic containers and can be removed and decolorized in a short time by treating the ink composition with a dilute aqueous alkali solution having a concentration of 1 to 3%.

As the result of intensive studies by the present inventors to solve the above problems, it was found that an ink composition comprising a vehicle obtained by adding one or more substances selected from the group consisting of styrene-acrylic acid copolymers, styrene-maleic acid resins, rosin-maleic acid resins and phenol resins to the main component which is a urethane resin and/or an acrylic resin shows no decrease in the printing property on plastic films and that prints using the ink composition can be removed in a short time by treating the ink composition with a dilute aqueous alkali solution having a concentration of 1 to 3%. The present invention has been completed on the basis of this knowledge.

Accordingly, the present invention provides (1) A removable ink composition comprising (A) a urethane resin and/or an acrylic resin and (B) one or more substances selected from the group consisting of styrene-acrylic acid copolymers, styrene-maleic acid resins, rosin-maleic acid resins and phenol resins as main components of a vehicle;

(2) A removable ink composition described in (1), which further comprises a cellulose resin as a component of the vehicle;

(3) A removable ink composition described in (1), wherein an amount of component B is less than an amount of component A;

(4) A removable ink composition described in any of (1) to (3), which further comprises organic and/or inorganic pigments;

(5) A removable ink composition described in any of (1) to (4), which further comprises powder of synthetic resins; and (6) A process for removing an ink composition from printed articles which comprises treating articles printed with an ink composition described in any of (1) to (5) with an aqueous alkali solution.

DESCRIPTION OF THE PREFERRED EMBODIMENTS

The present invention is described more specifically in the following.

As the urethane resin of component A used in the present invention, linear polyurethane-polyurea resins are mainly used. More specifically, for example, (a) a urethane prepolymer which is obtained by the reaction of a mixture of a dihydroxy compound having a carboxyl group and a polyol compound having terminal hydroxyl groups and a molecular weight of 1,000 to 6,000 with a diisocyanate compound in an amount by equivalent larger than that of the hydroxyl groups in the above mixture and which has isocyanate groups at the chain ends and dicarboxyl groups inside the molecular chain and (b) a chain extender of a diamine compound are reacted in an organic solvent to obtain a resin intermediate containing carboxyl group, and the a carboxyl group in the obtained resin intermediate is neutralized with a polyamide resin having an amine value of 100 to 500 to prepare a polyurethane-polyurea resin. The prepared resin can be used as the urethane resin of component A. Two-component type urethane resins can also be used as the urethane resin of component A. As the acrylic resin, homopolymers or copolymers of an acrylic ester or a methacrylic ester can be used.

Examples of the preferable acrylic ester and methacrylic ester (hereinafter, abbreviated as the (meth)acrylic ester)

used in the present invention include methyl (meth)acrylate, ethyl (meth)acrylate and butyl (meth)acrylate. Examples of the copolymer include copolymers of two or more types of the above (meth)acrylic esters and copolymers of one or more types of the above (meth)acrylic esters and one or more compounds selected from the group consisting of styrene, (meth)acrylic acid, acrylonitrile, vinyl acetate and butadiene.

Preferable examples of the styrene-acrylic acid copolymer used as component B in the present invention include copolymers which contain 20 to 40% by weight of styrene, 5 to 15% by weight of methyl methacrylate, 10 to 30% by weight of butyl acrylate and 10 to 20% by weight of acrylic acid as the main components and have an acid value of 100 to 240, a molecular weight of 1,600 to 20,000 and Tg of 60 to 85° C.

As the phenol resin, resins containing as the main component a phenolformaldehyde resin of the resol type or the novolak type which is obtained by the reaction of phenol having no substituents, a phenol having substituents or a derivative thereof with formaldehyde can be used. Phenolformaldehyde resins of the resol type are preferably used.

As the styrene polymer and styrene-maleic acid resin used in the present invention, a homopolymer of styrene, copolymers of styrene and maleic anhydride and copolymers of styrene and a monoester of maleic acid which have an acid value of 180 to 280 and a molecular weight of 2,000 to 70,000 are used. The above polymers and copolymers having a low molecular weight, i.e., the polymers and copolymers having an acid value of 180 to 280, Tg of 60 to 70° C. and a molecular weight of 2,000 to 20,000, are preferably used.

As the rosin-maleic acid resin, rosin-maleic acid resins having an acid value of 110 to 300 and Tg of 130 to 150° C. and soluble in an alcohol are preferably used.

In the present invention, the ink composition may comprise other resins in addition to components A and B as the components of the vehicle. The other resin may be any type of resin as long as the resin can be used for ink compositions for gravure printing or flexo printing. Examples of such resins include chlorinated polyolefin resins, polyamide resins, coumarone resins, ketone resins, vinyl acetate resins, polyvinyl butyral resins, epoxy resins, urea resins, cellulose resins, ethylene-vinyl acetate resins, polyester resins, chorinated rubbers and cyclized rubbers.

The components of the vehicle in the present invention are used in amounts such that the amount of component B is 5 to 95 parts by weight and preferably 20 to 80 parts by weight per 100 parts by weight of component A. When the amount of component B is less than 5 parts by weight, the ink composition is not removed or decolorized after the printed article is dipped into a dilute alkali solution for about 30 minutes and such an amount is not preferable. When the amount of component B exceeds 95 parts by weight, folding resistance, crumpling resistance and water resistance are adversely affected and such an amount is not preferable.

In the present invention, pigments which are generally used in ink compositions for gravure printing are used. Examples of the pigment include inorganic pigments such as ultramarine blue, Prussian blue, cobalt blue, red iron oxide, iron black, yellow iron oxide, titanium dioxide, carbon black, zinc oxide and titanium black; and organic pigments such as monoazo pigments, disazo pigments, condensed azo pigments, phthalocyanine pigments, anthraquinone pigments, quinacridone pigments, isoindolinone pigments, thioindigo pigments, dioxazine pigments and pyrolopyrrole pigments.

The used amount of the pigment varies depending on the color tone and color density to be exhibited. The pigment is generally used in an amount in the range of about 0.3 to 50% by weight of the total amount of the ink composition.

The ink composition of the present invention also contains fillers, wax, fine powder of plastics and plasticizers in order to maintain properties of the ink composition such as viscosity, fluidity and the thixotropic property, to provide printed faces with the slipping property and to form printed faces with gloss or without gloss.

Examples of the filler include silica, alumina, talc, kaolin and calcium carbonate. Examples of the wax include polyethylene wax and polypropylene wax. Examples of the fine powder of plastics include fine powder of styrene resins, acrylic resins, polyurethane resins, polyimide resins, melamine resins and benzoguanamine resins. Examples of the plasticizer include esters of phthalic acid such as dibutyl phthalate, dioctyl phthalate and dicyclohexyl phthalate; esters of phosphoric acid such as tricresyl phosphate and trichloroethyl phosphate; dioctyl adipate; diisobutyl adipate; dioctyl sebacate; epoxidized linseed oil; epoxidized soy bean oil and sulfonamide plasticizers.

In the present invention, an organic solvent such as ethyl acetate, butyl acetate, acetone, methyl ethyl ketone (MEK), methyl isobutyl ketone, methanol, ethanol, isopropanol (IPA), propyl acetate, propylene glycol monopropyl ether, propylene glycol monomethyl ether acetate, toluene and xylene is used as an essential component. The organic solvent is used in an amount such that the ratio by weight of the total amount of components A and B, the pigments and other additives to the amount of the organic solvent is 20:80 to 50:50 and preferably 25:75 to 40:60. When the ratio by weight is less than 20:80, the physical properties of the layer of prints coating the surface of an article are insufficient. When the ratio by weight exceeds 50:50, fluidity of the ink composition decreases to cause inferior workability. Therefore, such ratios are not preferable.

The layer of prints on a polyester film formed with the ink composition of the present invention exhibits physical properties as satisfactory as those exhibited by the layers formed with conventional ink compositions. When the film having the above layer of prints is dipped into an aqueous solution of sodium hydroxide having a concentration of 1 to 3% at 80 to 90° C. and the solution is stirred for 20 to 30 minutes, the layer of prints can be completely removed from the surface of the film. When the film from which the printed layer has been removed is washed with water and dried, a clear film having no layer of prints at all can be obtained.

When plastic containers of refreshing drinks which are attached with shrink labels printed with the ink composition of the present invention on the surface or is printed with the ink composition of the present invention directly on the surface is treated with a dilute aqueous alkali solution, the layer of prints can be removed very easily and the containers can be decolorized. Thus, the containers are easily made colorless. The colorless containers can be pulverized, pelletized and reused as a material resin for various products. The same advantageous result can be obtained when plastic containers attached with printed shrink labels are treated with a dilute aqueous alkali solution after the plastic containers have been pulverized.

To summarize the advantages obtained by the present invention, the ink composition of the present invention exhibits the same properties, such as printing property on plastic products, as conventional ink compositions for gravure printing on plastics.

Layers of prints on various types of plastic articles printed with the ink composition of the present invention can be easily removed and decolorized by dipping the plastic articles into a relatively dilute aqueous alkali solution in a short time. Therefore, the used plastic articles can advantageously be reused as a material for plastic articles.

EXAMPLES

The present invention is described more specifically with reference to the following examples.

Example 1

The following components were placed into a paint shaker and dispersed for 30 to 60 minutes to obtain a printing ink composition.

|  | colored (parts by weight) | white (parts by weight) |
|---|---|---|
| Urethane resin | 35 | 27 |
| trade name, SANPRENE IB104; |  |  |
| manufactured by SANYO KASEI Co., Ltd.; |  |  |
| a toluene-MEK-IPA solution; |  |  |
| solid content, 30% by weight |  |  |
| Cellulose resin | 2 |  |
| an ethyl acetate-IPA solution; |  |  |
| nitrocellulose, 30% by weight |  |  |
| Cellulose resin |  | 10 |
| an ethyl acetate-IPA solution; |  |  |
| cellulose acetate butyrate, 10% by weight |  |  |
| Polyethylene wax | 0.5 | 0.5 |
| Methyl ethyl ketone | 25.0 | 14.0 |
| Toluene | 20.0 | 10.0 |
| Isopropyl Alcohol | 2.0 | 3.0 |
| Styrene-acrylic acid resin | 5.0 | 5.0 |
| trade name, JOHNCRYL 682; |  |  |
| manufactured by JOHNSON POLYMER Company; |  |  |
| acid value 235; |  |  |
| molecular weight, 1,600; |  |  |
| Tg, 57° C. |  |  |
| Copper phthalocyanine blue pigment | 10.0 |  |
| Titanium dioxide |  | 30.0 |

Examples 2 to 18

Printing ink compositions were obtained in accordance with the same procedure as that in Example 1 using the components shown in Table 1-1 to Table 2-3.

Comparative Example 1

A printing ink composition was obtained in accordance with the same procedure as that in Example 1 except that component B (the styrene-acrylic acid resin) was not used.

Comparative Example 2

A printing ink composition was obtained in accordance with the same procedure as that in Example 10 except that component B (the styrene-acrylic acid resin) was not used.

TABLE 1

|  | Example 1 | | Example 2 | | Example 3 | |
|---|---|---|---|---|---|---|
|  | colored | white | colored | white | colored | white |
| Component A | | | | | | |
| urethane resin (30%)[1] | 35.0 | 27.0 | 35.0 | 27.0 | 35.2 | 27.0 |
| cellulose resin (30%) nitrocellulose | 2.0 | — | 2.0 | — | 2.0 | — |
| cellulose resin (10%) nitrocellulose | — | 10.0 | — | 10.0 | — | 10.0 |
| polyethylene wax | 0.5 | 0.5 | 0.5 | 0.5 | 0.5 | 0.5 |
| methyl ethyl ketone | 25.0 | 14.0 | 20.0 | 6.0 | 17.0 | 4.0 |
| toluene | 20.0 | 10.0 | 10.0 | 4.0 | 27.0 | 2.0 |
| isopropyl alcohol | 2.0 | 2.0 | 2.0 | 2.0 | 2.0 | 1.0 |
| Component B | | | | | | |
| styrene-acrylic acid resin 50%[2] | 5.0 | 5.0 | 20.0 | 20.0 | 25.0 | 25.0 |
| phenol resin (65%)[3] | — | — | — | — | — | — |
| styrene-maleic acid resin (40%)[4] | — | — | — | — | — | — |
| Organic pigment copper phthalocyanine blue | 10.0 | — | 10.0 | — | 10.0 | — |
| Inorganic pigment titanium dioxide | — | 30.0 | — | 30.0 | — | 30.0 |

|  | Example 4 | | Example 5 | | Example 6 | |
|---|---|---|---|---|---|---|
|  | colored | white | colored | white | colored | white |
| Component A | | | | | | |
| urethane resin (30%)[1] | 35.0 | 27.0 | 35.0 | 27.0 | 35.0 | 27.0 |
| cellulose resin (30%) nitrocellulose | 2.0 | — | 2.0 | — | 2.0 | — |
| cellulose resin (10%) nitrocellulose | — | 10.0 | — | 10.0 | — | 10.0 |
| polyethylene wax | 0.5 | 0.5 | 0.5 | 0.5 | 0.5 | 0.5 |
| methyl ethyl ketone | 20.0 | 9.0 | 30.0 | 16.0 | 17.0 | 4.0 |
| toluene | 10.0 | 5.0 | 14.0 | 8.0 | 8.0 | 2.0 |
| isopropyl alcohol | 2.0 | 2.0 | 2.0 | 2.0 | 2.0 | 1.0 |
| Component B | | | | | | |
| styrene-acrylic acid resin 50%[2] | — | — | — | — | — | — |
| phenol resin (65%)[3] | 3.0 | 3.0 | 5.0 | 5.0 | 25.0 | 25.0 |
| styrene-maleic acid resin (40%)[4] | — | — | — | — | — | — |
| Organic pigment permanent carmine pigment[5] | 10.0 | — | 10.0 | — | 10.0 | — |
| Inorganic pigment titanium dioxide | — | 30.0 | — | 30.0 | — | 30.0 |

|  | Example 7 | | Example 8 | | Example 9 | |
|---|---|---|---|---|---|---|
|  | colored | white | colored | white | colored | white |
| Component A | | | | | | |
| urethane resin (30%)[1] | 35.0 | 27.0 | 35.0 | 27.0 | 35.0 | 27.0 |
| cellulose resin (30%) nitrocellulose | 2.0 | — | 2.0 | — | 2.0 | — |
| cellulose resin (10%) nitrocellulose | — | 10.0 | — | 10.0 | — | 10.0 |
| polyethylene wax | 0.5 | 0.5 | 0.5 | 0.5 | 0.5 | 0.5 |
| methyl ethyl ketone | 27.0 | 18.0 | 30.0 | 17.0 | 17.0 | 3.0 |
| toluene | 14.0 | 8.0 | 15.0 | 8.0 | 8.0 | 2.0 |
| isopropyl alcohol | 2.0 | 2.0 | 2.0 | 2.0 | 2.0 | 2.0 |
| Component B | | | | | | |
| styrene-acrylic acid resin 50%[2] | — | — | — | — | — | — |
| phenol resin (65%)[3] | — | — | — | — | — | — |
| styrene-maleic acid resin (40%)[4] | 3.0 | 3.0 | 5.0 | 5.0 | 25.0 | 25.0 |
| Organic pigment disazo yellow pigment[6] | 8.0 | — | 8.0 | — | 8.0 | — |
| Inorganic pigment titanium dioxide | — | 30.0 | — | 30.0 | — | 30.0 |

TABLE 2-1

|  | Example 10 | | Example 11 | | Example 12 | |
|---|---|---|---|---|---|---|
|  | colored | white | colored | white | colored | white |
| Component A | | | | | | |
| acrylic resin (35%)[7] | 40.0 | 27.0 | 40.0 | 27.0 | 40.0 | 27.0 |
| cellulose resin (20%) nitrocellulose | 10.0 | 7.0 | 10.0 | 7.0 | 10.0 | 7.0 |
| urethane resin (30%)[1] | 10.0 | 10.0 | 10.0 | 10.0 | 10.0 | 10.0 |
| polyethylene wax | 0.5 | 2.5 | 0.5 | 2.5 | 0.5 | 2.5 |
| ethyl acetate | 10.0 | 7.0 | 3.0 | 1.0 | 2.0 | — |
| isopropyl alcohol | 24.0 | 12.0 | 6.0 | 2.0 | 2.0 | — |
| Component B | | | | | | |
| styrene-acrylic acid resin 50%[2] | 4.0 | 4.0 | 20.0 | 20.0 | 25.0 | 25.0 |
| phenol resin (65%)[3] | — | — | — | . | — | — |
| styrene-maleic acid resin (40%)[4] | — | — | — | — | — | — |
| Organic pigment permanent carmine pigment[5] | 10.0 | — | 10.0 | — | 10.0 | — |
| Inorganic pigment titanium dioxide | — | 30.0 | — | 30.0 | — | 30.0 |

|  | Example 13 | | Example 14 | | Example 15 | |
|---|---|---|---|---|---|---|
|  | colored | white | colored | white | colored | white |
| Component A | | | | | | |
| acrylic resin (35%)[7] | 40.0 | 27.0 | 40.0 | 27.0 | 40.0 | 27.0 |
| cellulose resin (20%) nitrocellulose | 10.0 | 7.0 | 10.0 | 7.0 | 10.0 | 10.0 |
| urethane resin (30%)[1] | 10.0 | 10.0 | 10.0 | 10.0 | 10.0 | 10.0 |
| polyethylene wax | 0.5 | 2.5 | 0.5 | 2.5 | 0.5 | 2.5 |
| ethyl acetate | 9.0 | 8.0 | 8.0 | 7.0 | 5.0 | 2.0 |
| isopropyl alcohol | 19.0 | 13.0 | 17.0 | 12.0 | 8.0 | 2.0 |
| Component B | | | | | | |
| styrene-acrylic acid resin 50%[2] | — | — | — | — | — | — |
| phenol resin (65%)[3] | 2.0 | 2.0 | 4.0 | 4.0 | 16.0 | 16.0 |
| styrene-maleic acid resin (40%)[4] | — | — | — | — | — | — |
| Organic pigment copper phthalocyanine blue | 10.0 | — | 10.0 | — | 10.0 | — |
| Inorganic pigment titanium dioxide | — | 30.0 | — | 30.0 | — | 30.0 |

|  | Example 16 | | Example 17 | | Example 18 | |
|---|---|---|---|---|---|---|
|  | colored | white | colored | white | colored | white |
| Component A | | | | | | |
| acrylic resin (35%)[7] | 40.0 | 27.0 | 40.0 | 27.0 | 40.0 | 27.0 |
| cellulose resin (20%) nitrocellulose | 10.0 | 10.0 | 10.0 | 10.0 | 10.0 | 10.0 |
| urethane resin (30%)[1] | 10.0 | 10.0 | 10.0 | 10.0 | 10.0 | 10.0 |
| polyethylene wax | 0.5 | 2.5 | 0.5 | 2.5 | 0.5 | 2.5 |
| ethyl acetate | 8.0 | 6.0 | 7.0 | 5.0 | 2.0 | — |
| isopropyl alcohol | 18.0 | 11.0 | 17.0 | 10.0 | 2.0 | — |
| Component B | | | | | | |
| styrene-acrylic acid resin 50%[2] | — | — | — | — | — | — |
| phenol resin (65%)[3] | — | — | — | — | — | — |
| styrene-maleic acid resin (40%)[4] | 3.0 | 3.0 | 5.0 | 5.0 | 25.0 | 25.0 |
| Organic pigment copper phthalocyanine blue | 10.0 | — | 10.0 | — | 10.0 | — |
| Inorganic pigment titanium dioxide | — | 30.0 | — | 30.0 | — | 30.0 |

Notes:

TABLE 2-1-continued

[1] SANPRENE IB104, a trade name; manufactured by SANYO KASEI Co., Ltd.).
[2] JOHNCRYL 682, a trade name; manufactured by JOHNSON POLYMER Company.
[3] HITANOL 4600, a trade name; manufactured by HITACHI KASEI Co., Ltd.; a solution in isopropanol; solid content, 65%.
[4] CA-6623; a trade name; manufactured by KINDAI KAGAKU Co., Ltd.; a 40% solution in a mixture of ethyl acetate and isopropanol.
[5] Pigment Red 5
[6] Pigment Yellow 83
[7] DIANAL BR-107, a trade name; manufactured by MITSUBISHI RAYON Co., Ltd.

Shrink films of polyethylene terephthalate were printed with the printing ink compositions obtained above in Examples and Comparative Examples and the properties for printing and easiness of removal with an aqueous alkali solution were examined. The obtained results are shown in Table 3-1 to Table 3-3. The tests and the evaluations were conducted in accordance with the following methods.

1. Preparation of Printed Films for the Tests

Using a bar coater #5, shrink films of polyethylene terephthalate SC004 (45 µm) and SC007 (50 µm) both manufactured by TOYO BOSEKI Co., Ltd. were coated with ink compositions to prepare films coated with colored ink compositions, films coated with white ink compositions and films having a layer of a colored ink composition laminated on top of a layer of a corresponding white ink composition.

2. Test Methods

The adhesion test by a pressure sensitive adhesive plastic tape was conducted using a pressure sensitive adhesive plastic tape manufactured by NICHIBAN Co., Ltd. and separation of the layer was visually observed.

The scratch resistance was evaluated by scratching the coated surface by nails and scratches formed on the coated surface were visually observed.

The crumpling resistance was evaluated by crumpling the film ten times by hands and cracks formed on the coated surface were visually observed.

The folding resistance was evaluated by folding the coated film and then squeezing the folded portion twice by fingers and cracks formed on the coated surface were visually observed.

The slipping property was evaluated by placing a coated surface on top of another coated surface and also on top of a surface not coated with the ink composition and then rubbing the films lightly to each other and the easiness of slipping felt by hands was compared.

The water resistance was evaluated by dipping the coated film into water at room temperature for 24 hours and whitening and change in adhesion of the coating layer were observed.

The easiness of removal by the alkali treatment was evaluated by dipping a coated film into an aqueous solution of sodium hydroxide having a concentration of 3% at 80 to 90° C. while the solution was stirred by a spatula at a time interval of 5 minutes and removal of the coating layer was visually observed. The results are shown in accordance with the following criterion:

good: removed in 20 minutes or less
fair: removed in 21 to 30 minutes
poor: not removed after 30 minutes

TABLE 3

| | | Adhesion to plastic tape | Scratch resistance | Crumpling resistance | Folding resistance | Slipping property | Water resistance | Removal by alkali treatment |
|---|---|---|---|---|---|---|---|---|
| Comparative Example 1 | colored | good | fair | good | good | poor to fair | good | poor to fair |
| | white | good | fair | good | good | poor to fair | good | poor to fair |
| Comparative Example 2 | colored | fair to good | fair | poor to fair | poor to fair | fair | good | poor |
| | white | fair to good | fair | poor to fair | poor to fair | fair | good | poor |
| Exampe 1 | colored | good | fair to good | good | good | fair | good | good |
| | white | good | good | good | good | fair | good | good |
| Example 2 | colored | good | fair to good | good | good | fair | good | good |
| | white | good | good | good | good | fair | good | good |
| Example 3 | colored | good | good | fair to good | fair to good | fair to good | good | good |
| | white | good | good | fair | fair | fair to good | fair to good | good |
| Example 4 | colored | good | fair | good | good | fair | good | fair to good |
| | white | good | fair | good | good | fair | good | fair to good |
| Example 5 | colored | good | fair to good | fair to good | fair to good | fair to good | good | good |
| | white | good | good | fair to good | fair | fair to good | good | good |
| Example 6 | colored | good | good | fair to good | fair to good | fair to good | fair to good | good |
| | white | good | good | fair | fair | fair to good | fair to good | good |
| Example 7 | colored | good | fair | fair to good | fair to good | fair | good | fair to good |
| | white | good | fair | fair to good | fair to good | fair to good | good | fair to good |
| Example 8 | colored | good | fair to good | fair to good | fair to good | fair to good | good | fair to good |
| | white | good | fair to good | fair to good | fair to good | fair to good | good | fair to good |
| Example 9 | colored | good | fair to good | fair to good | fair to good | fair to good | good | good |
| | white | good | fair to good | fair to good | fair to good | fair to good | fair to good | good |
| Example 10 | colored | good | fair to good | fair to good | fair to good | good | good | good |
| | white | good | good | fair to good | fair to good | good | good | good |
| Example 11 | colored | good | good | fair | fair to good | good | good | good |
| | white | good | good | fair | fair to good | good | good | good |
| Example 12 | colored | good | good | fair | fair | good | good | good |
| | white | good | good | fair | fair | good | good | good |
| Example 13 | colored | good | fair | fair to good | fair to good | good | good | fair |
| | white | good | good | fair to good | fair to good | good | good | fair to good |
| Example 14 | colored | good | fair to good | fair to good | fair to good | good | good | good |
| | white | good | good | fair to good | fair to good | good | good | good |
| Example 15 | colored | good | good | fair | fair | good | good | good |
| | white | good | good | fair to good | fair to good | good | good | good |
| Example 16 | colored | good | fair | fair | fair | fair | good | fair |
| | white | good | fair to good | fair | fair | fair to good | good | fair |
| Example 17 | colored | good | fair to good | fair | fair to good | fair to good | good | fair |
| | white | good | fair to good | fair | fair to good | good | good | good |

TABLE 3-continued

|  |  | Adhesion to plastic tape | Scratch resistance | Crumpling resistance | Folding resistance | Slipping property | Water resistance | Removal by alkali treatment |
|---|---|---|---|---|---|---|---|---|
| Example 18 | colored | good | fair to good | fair | fair to good | fair to good | fair to good | fair to good |
|  | white | good | good | fair | fair to good | fair to good | fair to good | fair to good |

What is claimed is:

1. A removable ink composition comprising (i) a component (A) comprising a urethane resin and a cellulose resin and (ii) a component (B) comprising a vehicle comprising as a main component one or more substances selected from the group consisting of a styrene-acrylic acid copolymer, a styrene-maleic acid resin, a rosin-maleic acid resin and a phenol resin, wherein the removable ink composition is resistant to water and is removable by a dilute aqueous alkali solution having a concentration of 1 to 3%.

2. A removable ink composition according to claim 1, wherein an amount of the component (B) is less than an amount of the component (A).

3. A removable ink composition according to claim 1, wherein the component (A) comprises an acrylic resin.

4. A removable ink composition according to claim 3, wherein an amount of the component (B) is less than an amount of the component (A).

5. A removable ink composition according to claim 1, which further comprises organic and/or inorganic pigments.

6. A removable ink composition according to claim 3, which further comprises at least one pigment selected from the group consisting of an organic pigment and an inorganic pigment.

7. A removable ink composition according to claim 2, which further comprises organic and/or inorganic pigments.

8. A removable ink composition according to claim 1, which further comprises powder of synthetic resins.

9. A removable ink composition according to claim 3, which further comprises powder of synthetic resins.

10. A removable ink composition according to claim 2, which further comprises powder of synthetic resins.

11. A removable ink composition according to claim 5, which further comprises powder of synthetic resins.

12. A removable ink composition according to claim 7, which further comprises powder of synthetic resins.

13. A process for removing an ink composition from printed articles which comprises treating articles printed with an ink composition according to claim 1, with an aqueous alkali solution.

14. A process for removing an ink composition from printed articles which comprises treating articles printed with an ink composition according to claim 3 with an aqueous alkali solution.

15. A process for removing an ink composition from printed articles which comprises treating articles printed with an ink composition according to claim 2 with an aqueous alkali solution.

16. A process for removing an ink composition from printed articles which comprises treating articles printed with an ink composition according to claim 5 with an aqueous alkali solution.

17. A process for removing an ink composition from printed articles which comprises treating articles printed with an ink composition according to claim 8 with an aqueous alkali solution.

18. A removable ink composition according to claim 1, wherein the urethane resin is a linear polyurethane-polyurea resin which is produced by reacting (i) a urethane prepolymer obtained by the reaction of a mixture of a dihydroxy compound having a carboxyl group and a polyol compound having terminal hydroxyl groups and having a molecular weight of 1,000 to 6,000 with a diisocyanate compound and which has isocyanate groups at the chain ends thereof and dicarboxyl groups inside the molecular chain thereof, with (ii) a chain extender of a diamine compound which is reacted in an organic solvent to obtain a resin intermediate containing a carboxyl group, and the carboxyl group in the resin intermediate is neutralized with a polyamide resin having an amine volume of 100 to 500; the acrylic resin is a homopolymer or a copolymer of an acrylic ester or a methacrylic ester; the styrene-acrylic acid copolymer contains 20 to 40 weight % styrene, 5 to 15 weight % methyl methacrylate, 10 to 30 weight % butyl acrylate and 10 to 20 weight % acrylic acid and has an acid value of 100 to 240, a molecular weight of 1,600 to 20,000 and a Tg of 60 to 85° C.; the phenol resin is a phenolformaldehyde resin of the resol type; the styrene-maleic acid resin is a copolymer of styrene and maleic anhydride or copolymer of styrene and a monoester of maleic acid, having an acid value of 180 to 280; a Tg of 60 to 70° C. and a molecular weight of 2,000 to 20,000; the rosin-maleic acid resin has an acid value of 110 to 300, a Tg of 130 to 150° C. and is soluble in alcohol; and component B is in an amount of 5 to 95 parts by weight per 100 parts by weight of component A.

19. A removable ink composition according to claim 18, wherein component B is in an amount of 20 to 80 parts by weight per 100 parts by weight of component A.

20. A removable ink composition according to claim 19, which further comprises (i) an ink which is a pigment in an amount of 0.3 to 50% by weight of the removable ink composition and (ii) an organic solvent which is in an amount such that a ratio of the components (A) and (B) and the pigment to the amount of the organic solvent is 20:80 to 50:50.

* * * * *